(12) United States Patent
Salter et al.

(10) Patent No.: US 10,773,632 B2
(45) Date of Patent: Sep. 15, 2020

(54) VEHICULAR CARGO RETAINER ASSEMBLY

(71) Applicant: Ford Global Technologies, LLC, Dearborn, MI (US)

(72) Inventors: Stuart C. Salter, White Lake, MI (US); Wei Xu, Nanjing (CN); James J. Surman, Clinton Township, MI (US); Satyanarayana Raju Vemulapati, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 15/919,815

(22) Filed: Mar. 13, 2018

(65) Prior Publication Data

US 2019/0283655 A1    Sep. 19, 2019

(51) Int. Cl.
| | |
|---|---|
| *B60P 7/08* | (2006.01) |
| *B60P 7/135* | (2006.01) |
| *B60R 7/02* | (2006.01) |
| *B60P 7/14* | (2006.01) |
| *B60P 3/00* | (2006.01) |
| *B60R 7/00* | (2006.01) |
| *B60R 5/00* | (2006.01) |
| *B62D 33/04* | (2006.01) |
| *B62D 33/02* | (2006.01) |

(52) U.S. Cl.
CPC ............... *B60P 7/135* (2013.01); *B60P 3/00* (2013.01); *B60P 3/007* (2013.01); *B60P 7/0892* (2013.01); *B60P 7/14* (2013.01); *B60R 5/00* (2013.01); *B60R 7/00* (2013.01); *B60R 7/02* (2013.01); *B62D 33/02* (2013.01); *B62D 33/04* (2013.01); *B62D 33/042* (2013.01)

(58) Field of Classification Search
CPC .. B60P 7/135; B60P 3/00; B60P 3/007; B60P 7/0892; B60P 7/14; B60R 7/02; B60R 5/04; B60R 5/00; B60R 5/045; B60R 7/00; B62D 33/02; B62D 33/04; B62D 33/042
USPC ........... 410/118, 129, 140, 121, 141, 94, 95; 296/24.4, 24.43, 24.44, 24.46, 24.45, 296/37.5, 37.6, 37.1, 37.8, 37.14, 37.15, 296/37.16, 39.2, 69
See application file for complete search history.

(56) References Cited

U.S. PATENT DOCUMENTS

| | | | | |
|---|---|---|---|---|
| 2,594,643 | A | * 4/1952 | Gustisha | ............... E05F 15/622 296/76 |
| 5,167,479 | A | 12/1992 | Bott | |
| 6,007,283 | A | 12/1999 | Labeur | |
| 6,308,873 | B1 | * 10/2001 | Baldas | ..................... B60R 7/02 217/15 |
| 6,585,465 | B1 | 7/2003 | Hammond et al. | |

(Continued)

OTHER PUBLICATIONS

Weathertech, "Cargo/Trunk Liner for Cars, SUVs and Minivans," (2017) (5 pages).

*Primary Examiner* — Stephen T Gordon

(74) *Attorney, Agent, or Firm* — David Coppiellie; Price Heneveld LLP

(57) ABSTRACT

A vehicular cargo restraint assembly includes a support platform. A plurality of panels are each movably coupled to the support platform. Each of the panels is independently movable between a first position wherein the panel is flat against the support platform, and a second position wherein the panel is offset from the support platform and configured to prevent the movement of cargo within a vehicle cabin.

17 Claims, 5 Drawing Sheets

(56) References Cited

U.S. PATENT DOCUMENTS

| | | | |
|---|---|---|---|
| 7,527,312 B1* | 5/2009 | Cucknell | B60R 5/04 296/24.4 |
| 7,631,919 B2* | 12/2009 | Schrader | B62D 33/0273 296/37.14 |
| 10,155,486 B2* | 12/2018 | Navarrete | B60P 7/0892 |
| 2003/0090120 A1* | 5/2003 | Barber | B60R 5/04 296/37.5 |

* cited by examiner

VEHICULAR CARGO RETAINER ASSEMBLY

FIELD OF THE INVENTION

The present invention generally relates to vehicle storage features, and more particularly, to a cargo retainer assembly for a vehicle.

BACKGROUND OF THE INVENTION

In an effort to increase available cargo space, vehicles may offer stowable seating assemblies and increased trunk space. However, the cargo may shift and slide in the vehicle cabin when the vehicle is in motion and the cargo is unrestrained, thereby potentially damaging the cargo. Additionally, cargo management systems that secure the cargo can take up considerable space, thus limiting the amount and the size of the cargo that a vehicle is able to stow. As such, there is a need to tailor the cargo space of a vehicle in order to optimize the carrying capacity of the vehicle cabin while effectively securing the cargo in place. The present disclosure is intended to satisfy this need.

SUMMARY OF THE INVENTION

According to a first aspect of the present invention, a vehicular cargo restraint assembly includes a support platform. A plurality of panels are each movably coupled to the support platform. Each of the panels is independently movable between a first position wherein the panel is flat against the support platform, and a second position wherein the panel is offset from the support platform and configured to prevent the movement of cargo within a vehicle cabin.

Embodiments of the first aspect of the invention can include any one or a combination of the following features:
- the plurality of panels form a contiguous array of panels;
- the plurality of panels are arranged in rows and columns;
- at least one of the panels is configured to be disposed upon the back of a seatback of a vehicle and is parallel with a vehicle floor when in the second position;
- the panels disposed upon the back of the seatback are configured to prevent vertical displacement of cargo while in the second position; and
- each of the plurality of panels is upright and orthogonal with respect to the support platform while in the second position; at least one of the plurality of panels enables access to a cargo enclosure while in the second position.

According to a second aspect of the present invention, a vehicular cargo restraint assembly includes a support platform. An array of panels are disposed upon the support platform. Each panel is selectively movable between a first position wherein the panel is flat against the support platform, and a second position wherein the panel is offset from the support platform and is configured to prevent the movement of cargo within a vehicle cabin.

Embodiments of the second aspect of the invention can include any one or a combination of the following features:
- at least a portion of the support platform is configured to abut the back of a seatback of a vehicle seat;
- at least one of the panels is disposed upon the portion of the support platform;
- at least one of the panels extends orthogonally from the seatback such that the at least one of the panels is parallel with a vehicle floor while in the second position;
- the vehicle seat is movable to a stowed position and the portion of the support platform is configured to fold to a flat position against the seatback while the vehicle seat is in the stowed position;
- the array of panels extends from a driver-side wall to a passenger-side wall of the vehicle cabin; and
- at least one of the panels encloses a storage compartment subjacent to the support platform while in the first position.

According to a third aspect of the present invention, a vehicular cargo restraint assembly includes a support platform and an array of panels. A mounting assembly is movably couples each panel to the support platform. A hinge is configured to secure a panel to the support platform and enable the panel to move between a first position wherein the panel is flat against the support platform, and a second position wherein the panel is offset from the support platform and configured to prevent the movement of cargo within a vehicle cabin. A bearing is configured to enable longitudinal rotation of the panel.

Embodiments of the third aspect of the invention can include any one or a combination of the following features:
- the mounting assembly includes a locking device configured to resist jostling forces of the cargo when a vehicle is in motion in order to hold the position of the panel;
- the bearing and the panel are configured to rotate about an axis of rotation that is orthogonal to the support platform; the bearing is configured to rotate at least 180 degrees; the hinge is electronically actuated from the first position to the second position; and
- the bearing is electronically actuated to rotate about the axis of rotation.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
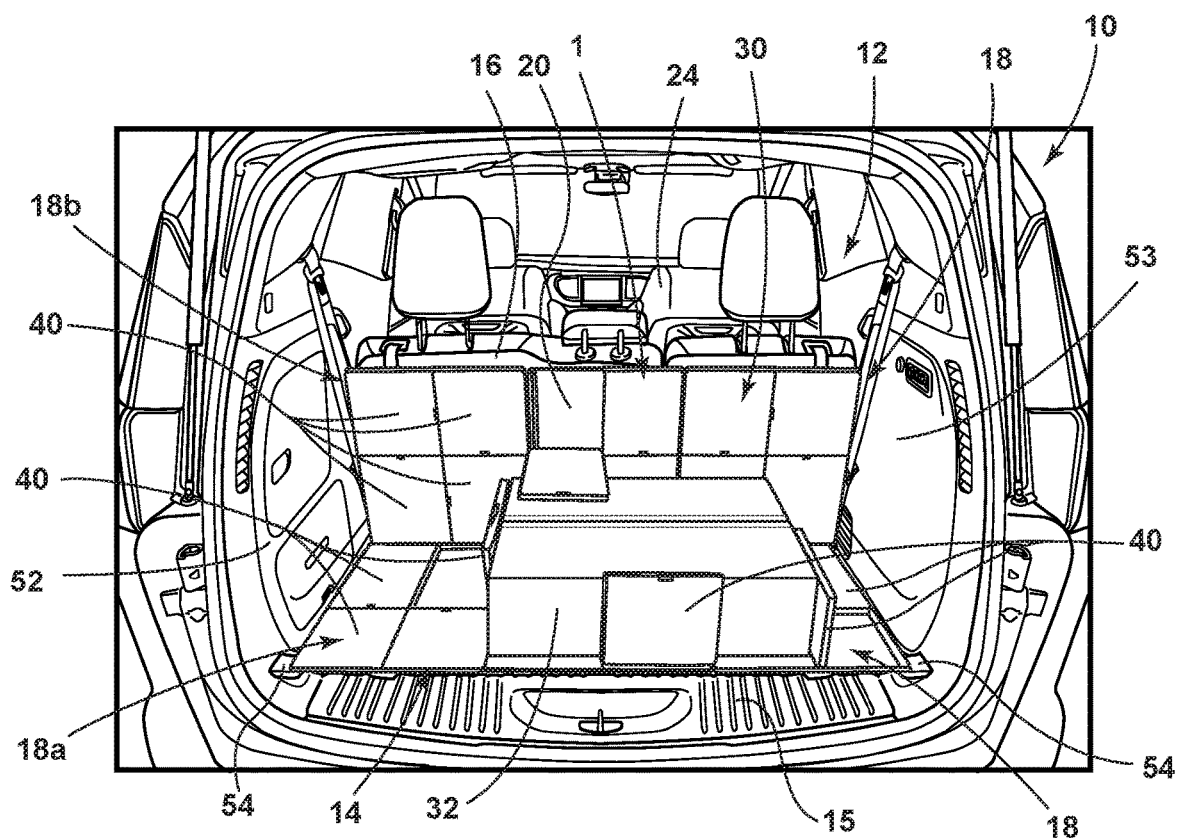
FIG. 1A illustrates a rear cargo compartment of a vehicle including a cargo retainer assembly, wherein a rear seating assembly is upright and in an unstowed position.

For purposes of description herein, the terms "upper," "lower," "right," "left," "rear," "front," "vertical," "horizontal," and derivatives thereof shall relate to the disclosure as oriented in FIG. 1A. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a cargo retainer assembly for a vehicle. The cargo retainer assembly includes an array of panels disposed upon a support platform. Each of the panels is independently movable between a first position wherein the panel is flat against the support platform, and a second position wherein the panel is offset from the support platform in order to prevent the movement of cargo within a vehicle cabin. While in a flat position, i.e., the first position, the panels are flat against the support platform in order to maximize cargo space within the vehicle cabin. Each panel may be actuated off the support platform and retained in an offset position, i.e., the second position, wherein the panel is configured to prevent cargo from moving about the vehicle cabin. When a rear seating assembly is in an upright and unstowed position, a portion of the support platform may abut one or more seatbacks of the rear seating assembly. As such, one or more panels associated with the portion of the support platform may be moved to the second position to prevent vertical displacement of cargo while the vehicle is in motion. Additionally, the portion of the support platform is configured to fold to a flat position when the rear seating assembly is adjusted to a stowed position.

Figure 1B:
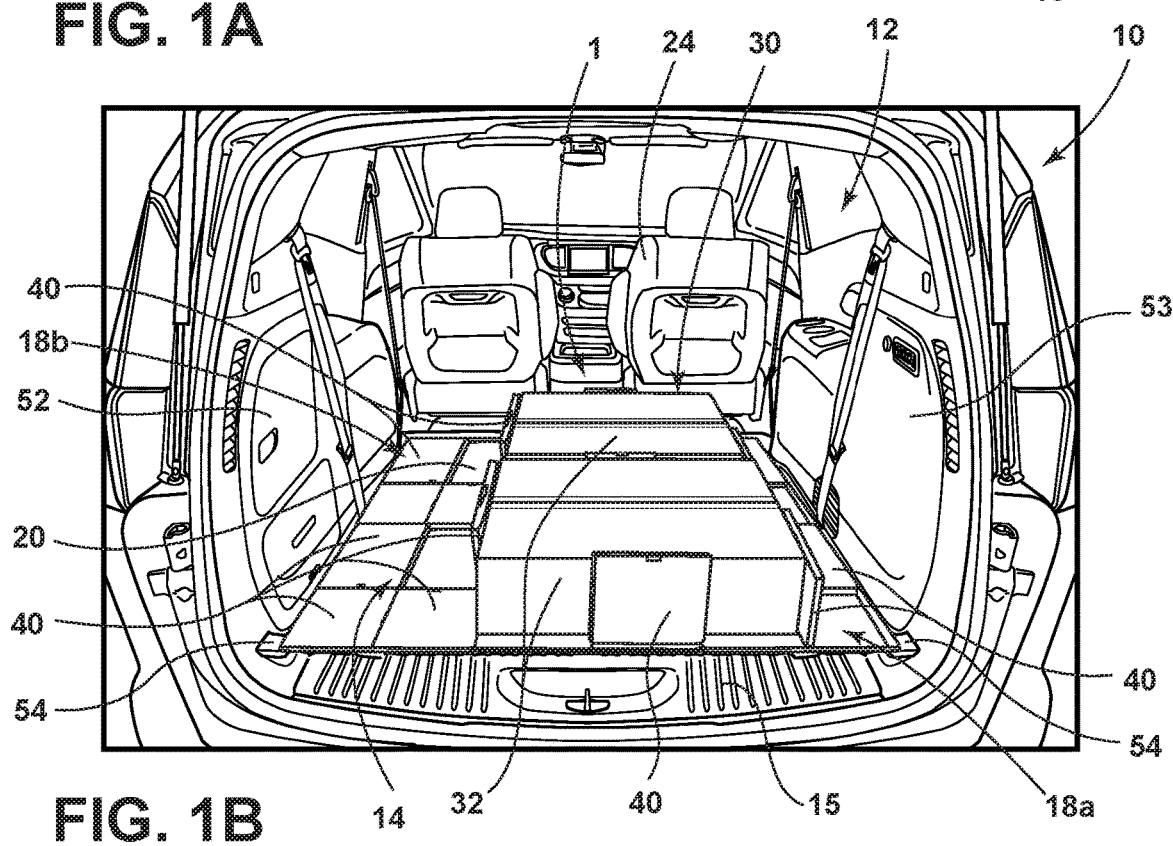
FIG. 1B illustrates the rear cargo compartment of the vehicle including the cargo retainer assembly, wherein the rear seating assembly is in a stowed position.

Referring to FIGS. 1A and 1B, a cargo retainer assembly 1 for a vehicle 10 is shown. A vehicle cabin 12 includes a trunk compartment 14 behind a rear seating assembly 16. As shown in FIG. 1A, the cargo retainer assembly 1 includes a support platform 18. The support platform 18 includes a first portion 18a that is raised relative to a vehicle floor 15 of the trunk compartment 14, and a second portion 18b that abuts the back of one or more seatbacks 20 of the rear seating assembly 16. Although the support platform 18 is shown to include a first and a second portion 18a, 18b, the support platform 18 may include additional or fewer portions than illustrated.

An array 30 of one or more panels 40 is coupled to the support platform 18 and extends from the first portion 18a to the second portion 18b of the support platform 18. Each of the panels 40 is generally planar. However, each of the panels 40 may be configured as other shapes. Each panel 40 is independently movable between the first position wherein the panel 40 is flat against the support platform 18, and the second position wherein the panel 40 is offset from the support platform 18 and configured to prevent the movement of cargo 32 within the vehicle cabin 12. While in the first position, the panels 40 coupled to the first portion 18a of the support platform 18a are parallel with the vehicle floor 15 and flat against the first portion 18a of the support platform 18, and the panels 40 coupled to the second portion 18b of the support platform 18 are flat against the second portion 18b of the support platform 18. In operation, one or more panels 40 may be actuated from the first position to the second position. The actuated panels 40 coupled to the first portion 18a of the support platform 18 generally extend upright from the first portion 18a of the support platform 18 while in the second position. The actuated panels 40 coupled to the second portion 18b of the support platform 18 extend orthogonally from the seatback 20 and are generally parallel with the vehicle floor 15 while in the second position. The actuated panels 40 on the first and second portions 18a, 18b may be selected to prevent the cargo 32 from being displaced vertically and/or horizontally.

With continued reference to FIGS. 1A and 1B, the rear seating assembly 16 is movable to a stowed position (FIG. 1B). While the rear seating assembly 16 is in the stowed position, the one or more support platform 18 is foldable such that the second portion 18b is flat against the back of the seatbacks 20 and generally parallel with the vehicle floor 15. When the support platform 18 is in a folded position, the support platform 18 may accommodate various depths of the vehicle floor 15. While the rear seating assembly 16 is in the stowed position, the support platform 18 extends up to a front seating assembly 24. One or more of the panels 40 may be actuated from the first position to the second position. The actuated panels 40 in the second position are upright and are configured to resist jostling forces of the cargo 32 in order to prevent movement of the cargo 32 within the vehicle cabin 12.

Figure 2:
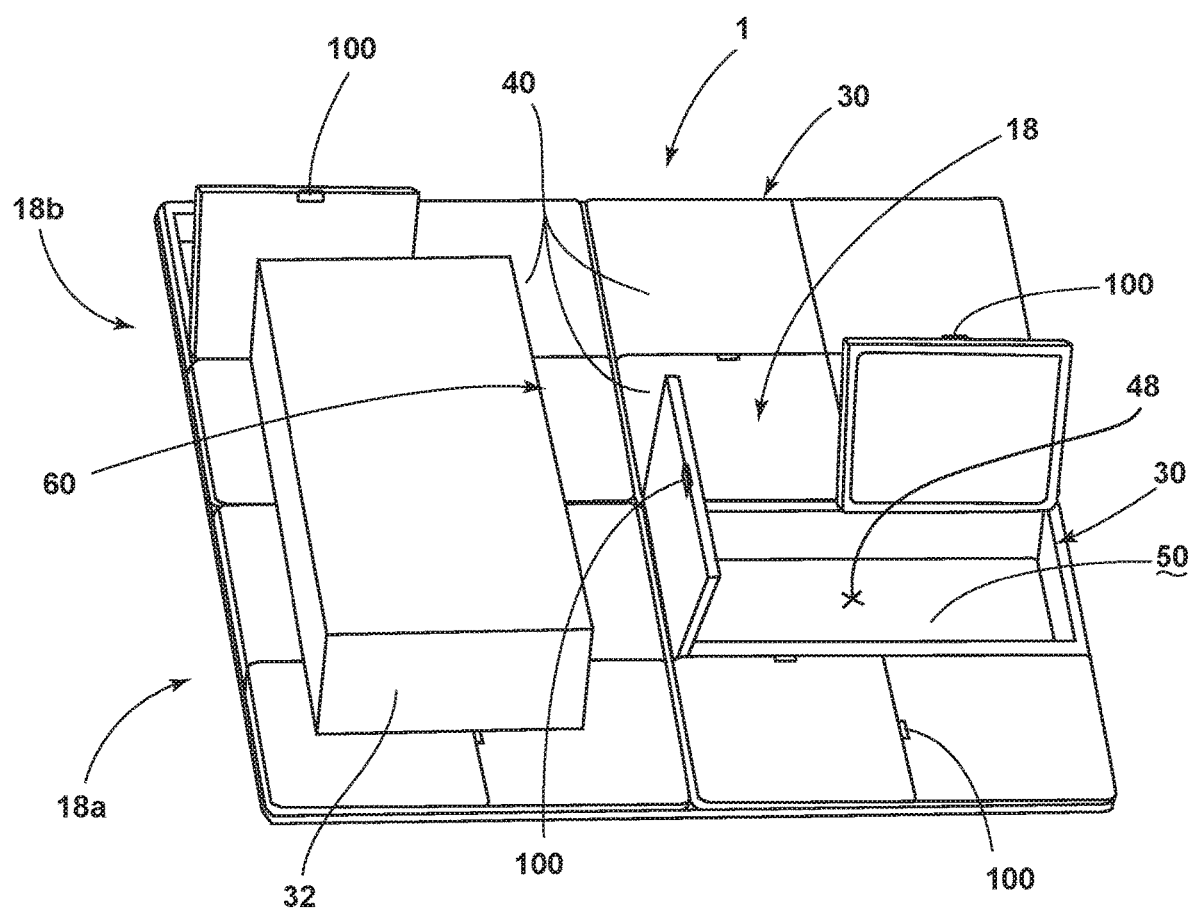
FIG. 2 illustrates the cargo retainer assembly including a plurality of panels movably coupled to a support platform.

Referring to FIGS. 1A and 1B, the support platform 18 may be raised off the vehicle floor and detachably mounted to driver-side and passenger-side walls 52, 53 via mounting corresponding brackets 54. Alternatively, the support platform 18 may be supported directly by the vehicle floor 15. As such, the support platform 18 is configured to accommodate the various depths of the vehicle floor 15, and may include one or more cavities 48 (FIG. 2) concealed by at least one panel 40. For instance, as shown in FIG. 2, one or more of the panels 40 may provide access to a subjacent storage compartment 50 provided between the support platform 18 and the vehicle floor 15. While in the first position, the panel 40 is configured to conceal the storage compartment 50. When adjusted to the second position, the storage compartment 50 is exposed and is configured to accept additional cargo. The panel 40 can be adjusted to the first position and the storage compartment 50 is concealed with the panel 40 acting as a lid.

With reference to FIGS. 1A-2, the array 30 extends from the driver-side wall 52 to the passenger-side wall 53 of the vehicle cabin 12 (FIGS. 1A and 1B). Generally, the panels 40 are uniformly distributed over the support platform 18 with each panel 40 being adjacent to at least one other panel 40. In the illustrated embodiment, the panels 40 are distributed as rows and columns disposed along the support platform 18. When one or more of the panels 40 is in the second position, the offset panels 40 may form one or more enclosures 60 configured to prevent movement and retain the position of cargo 32 within the vehicle cabin 12 (FIG. 2). The offset panels 40 may define one or more walls of the enclosures 60. The driver-side or passenger-side walls 52, 53 may additionally or alternatively make up at least one other wall of the enclosures 60. The size, shape and dimensions of the enclosures 60 may vary depending upon the intended cargo, cabin dimensions, and seating arrangements of the vehicle 10. For instance, the panels 40 may form a plurality of rectangular enclosures 60 of congruent dimensions along the support platform 18. In another embodiment, the array 30 of panels 40 may include a plurality of panels 40 staggered at varying locations along the support platform 18.

Figure 3:
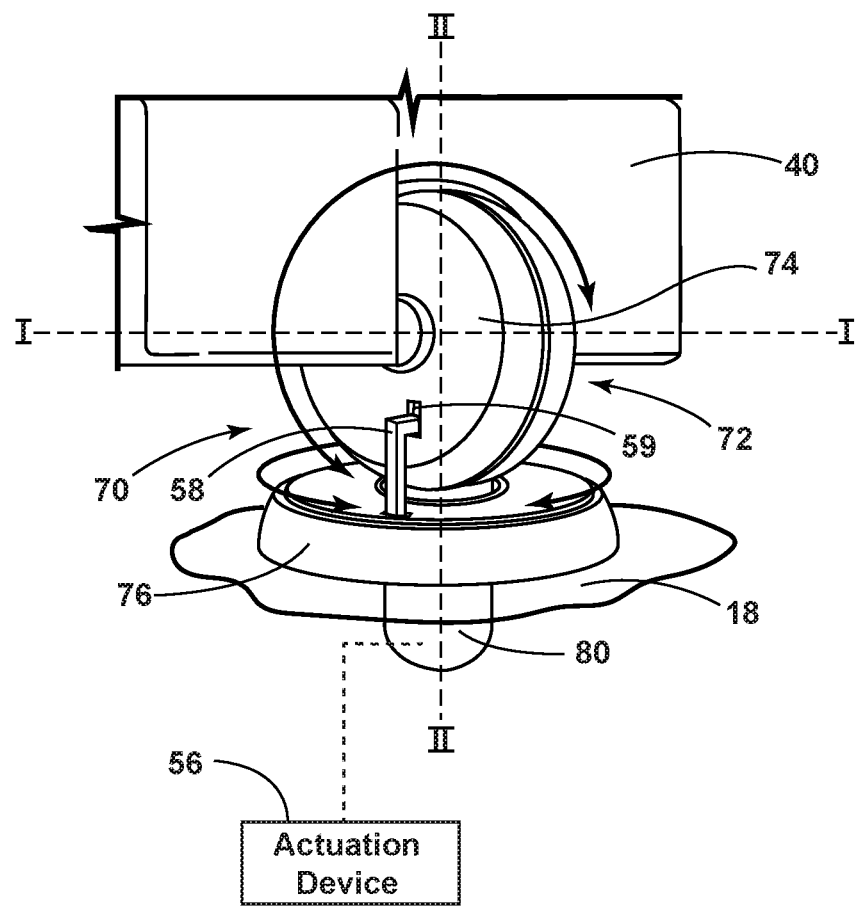
FIG. 3 illustrates a mounting assembly for coupling a panel to the support platform.

Referring to FIG. 3, each of the plurality of panels 40 is mounted to the support platform 18 via a mounting assembly 70. The mounting assembly 70 includes a hinge 72 coupled to the panel 40 to define a mounting axis shown by line I-I and extending parallel with respect to the support platform 18. The hinge 72 includes an annular member 74 configured to pivot about the mounting axis in order to adjust the panel 40 between the flat and offset positions. The hinge 72 may be adapted to lock the panel 40 in the second position in order to resist the momentum of moving cargo within the vehicle cabin 12 without displacing the panel 40 from the second position. A stationary mounting plate 76 couples the mounting assembly 70 to the support platform 18. The mounting plate 76 is anchored to the support platform 18 and coupled to the hinge 72.

With continued reference to FIG. 3, the mounting assembly 70 additionally includes a radial bearing 80 coupled to the stationary mounting plate 76. The radial bearing 80 is configured to rotate about an axis of rotation defined by line II-II that extends through the center of the radial bearing 80. As the radial bearing 80 is rotated, the panel 40 is also rotated about the axis of rotation. Each panel 40 is adapted to rotate about the axis of rotation in order to receive and retain cargo 32 of varying dimensions. Additionally, the radial bearing 80 is configured to lock in the angular position of the panel 40 in order to securely retain the cargo 32 without unwanted rotation of the panel 40. The rotational capabilities of the panels 40 ensure that cargo is securely fastened within the vehicle cabin 12 without resulting in a loss of cargo space. The radial bearing 80 is configured to rotate at least 180 degrees around the axis of rotation in order to adjust the panel 40 to a unique angular position.

With respect to the embodiments described herein, the panels 40 may be manually or electronically actuated. An actuation device 56 may enable adjustment of one or more panels 40 from the first position to the second position, and vice versa. The actuation device 56 may provide resistance against jostling forces of the cargo when the vehicle 10 is in motion in order to prevent displacement of the panel 40 from the second position. Additionally, the actuation device 56 may power rotation of the radial bearing 80 in order to adjust the angular position of the panel 40 and prevent unwanted rotation of the panel 40 caused by the momentum of cargo while the vehicle 10 is in motion. Alternatively, the mounting assembly 70 may include a locking device 58 that is configured to lock at least one of the panels 40 in the second position. The locking device 58 may be coupled to the mounting plate 76 and configured to abut the annular member 74 at locking detent 59. The locking device 58 may prevent the momentum of cargo from forcing the panel 40 from the second position while the vehicle 10 is in motion. The locking device 58 may additionally prevent rotation of the radial bearing 80 in response to the momentum of cargo while the vehicle 10 is in motion. In this embodiment, the panel 40 may include a latch 100 (FIG. 2) that enables a user to manually adjust the panel 40 from the flat position to the offset position.

Figure 4:
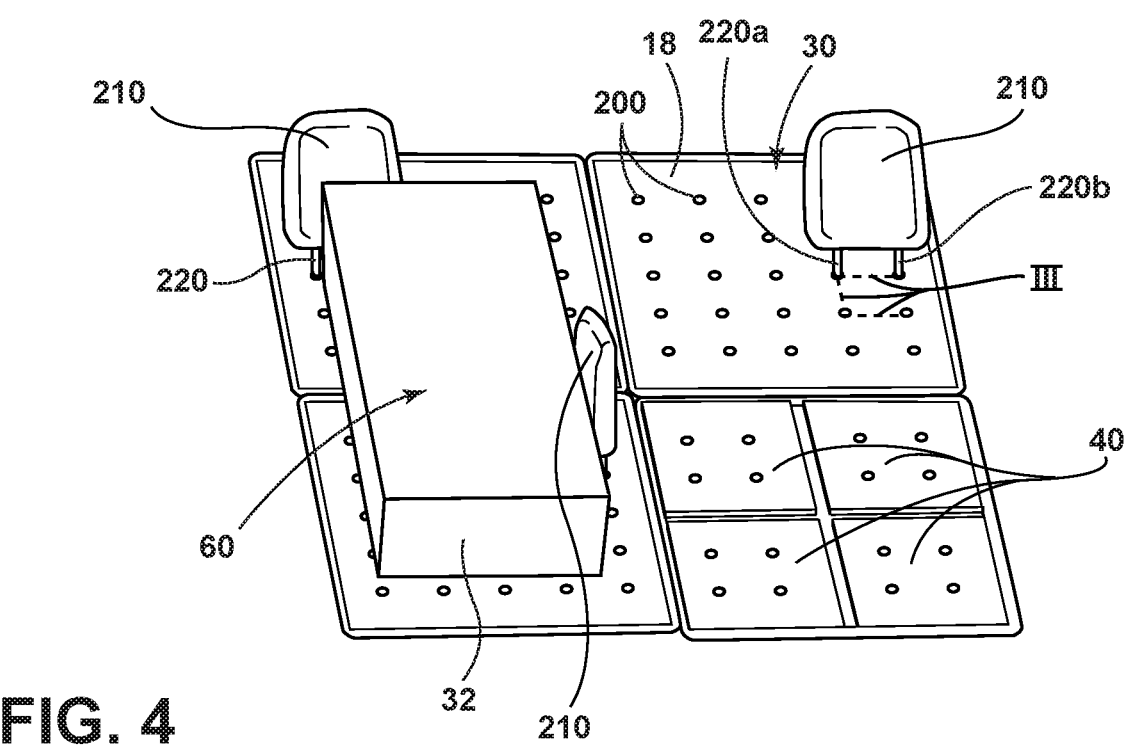
FIG. 4 illustrates the cargo retainer assembly including an array of apertures for coupling a headrest to the support platform.
Figure 5:
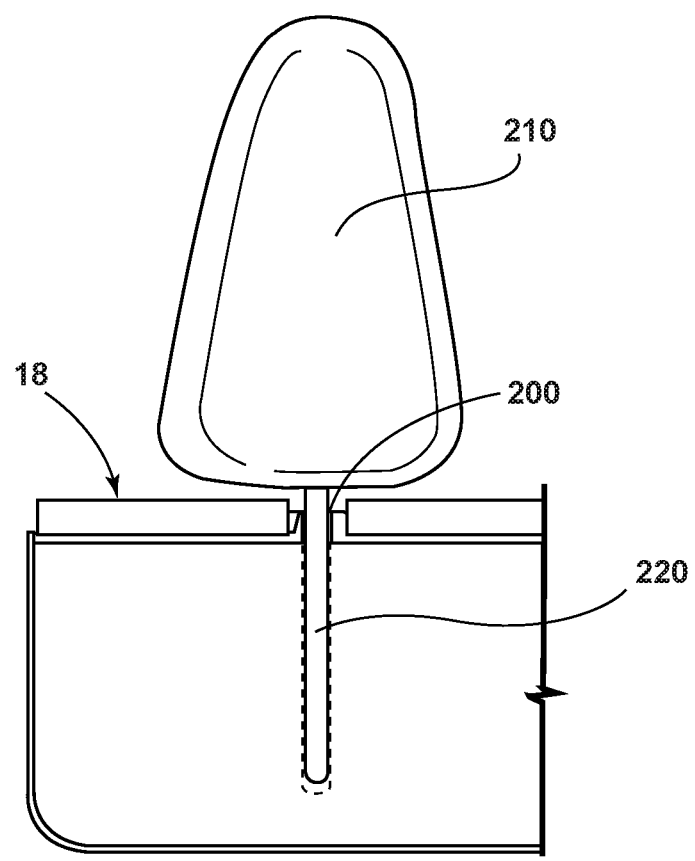
FIG. 5 illustrates an aperture of the cargo restraint assembly.

Referring to FIGS. 4 and 5, the cargo retainer assembly 1 may include one or more apertures 200 formed in the array 30 for mounting a removable headrest 210 to the support platform 18. The apertures 200 are positioned in rows and columns along the array 30. However, the array 30 may include a plurality of apertures 200 staggered at various locations therealong. Each aperture 200 is configured to accept a headrest rod 220 and work in pairs to accommodate a headrest 210 for retaining cargo 32. The headrest 210 is configured to prevent the movement of cargo within the vehicle 10 while it is coupled to the support platform 18. Each of the apertures 200 is spaced along the array 30 to easily accommodate the headrest rods 220 of the headrest 210 in a multitude of positions. To do so, the distance (line III) between each aperture 200 corresponds to a distance between a pair of headrest rods 220a, 220b of the headrest 210. The apertures 200 may be formed through at least one of the panels 40 located on the array 30. Additionally, at least one of the removable headrests 210 may form at least one wall of the enclosure 60 for retaining the cargo 32.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or number of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicular cargo restraint assembly, comprising:
a support platform; and
a plurality of panels each movably coupled to the support platform wherein each of the panels is independently movable between a first position wherein the panel is flat against the support platform, and a second position wherein the panel is orthogonal relative to the support platform and configured to prevent the movement of cargo within a vehicle cabin;
a mounting assembly configured to couple each of the plurality of panels to the support platform, the mounting assembly including:
a hinge coupled to a panel of the plurality of panels to define a mounting axis; and
a mounting plate coupled to the support platform and operably coupled to the hinge; and
an actuation device communicatively coupled to the mounting assembly and configured to pivotally transition each of the plurality of panels between the first position and second position.

2. The vehicular cargo restraint assembly of claim 1, wherein the plurality of panels form a contiguous array of panels.

3. The vehicular cargo restraint assembly of claim 2, wherein the plurality of panels are distributed in rows and columns.

4. The vehicular cargo restraint assembly of claim 1, wherein at least one of the panels is configured to be disposed upon the back of a seatback of a vehicle and is parallel with a vehicle floor when in the second position.

5. The vehicular cargo restraint assembly of claim 4, wherein the at least one panel is configured to be disposed upon the back of the seatback to prevent vertical displacement of cargo while in the second position.

6. The vehicular cargo restraint assembly of claim 1, wherein each of the plurality of panels is upright and orthogonal with respect to the support platform while in the second position.

7. The vehicular cargo restraint assembly of claim 1, wherein at least one of the plurality of panels enables access to a cargo enclosure while in the second position.

8. A vehicular cargo restraint assembly, comprising:
a support platform, wherein at least a portion of the support platform abuts the back of a seatback of a vehicle seat;
an array of panels disposed upon the support platform wherein each panel is selectively movable between a first position wherein the panel is flat against the support platform, and a second position wherein the panel is orthogonal relative to the support platform and is configured to prevent the movement of cargo within a vehicle cabin; and
an actuation device operably coupled to the array of panels and configured to pivotally transition each panel of the array of panels between the first position and the second position.

9. The vehicular cargo restraint assembly of claim 8, wherein at least one of the panels is selectively disposed upon the portion of the support platform that abuts the seatback.

10. The vehicular cargo restraint assembly of claim 9, wherein the at least one of the panels extends orthogonally from the seatback such that the at least one of the panels is parallel with a vehicle floor while in the second position.

11. The vehicular cargo restraint assembly of claim 8, wherein the vehicle seat is movable to a stowed position and the portion of the support platform is configured to fold to a flat position against the seatback while the vehicle seat is in the stowed position.

12. The vehicular cargo restraint assembly of claim 8, wherein the array of panels extends from a driver-side wall to a passenger-side wall of the vehicle cabin.

13. The vehicular cargo restraint assembly of claim 8, wherein at least one of the panels encloses a storage compartment subjacent to the support platform while in the first position.

14. A vehicular cargo restraint assembly, comprising:
a support platform;
an array of panels;
a mounting assembly movably coupling each panel to the support platform and comprising:
a hinge configured to secure at least one panel of the array of panels to the support platform and enable the panel to move between a first position wherein the panel is flat against the support platform, and a second position wherein the panel is orthogonal relative to the support platform and configured to prevent the movement of cargo within a vehicle cabin; and
a bearing configured to enable longitudinal rotation of the panel, wherein the bearing and the panel are configured to rotate about an axis of rotation that is orthogonal to the support platform, and wherein the bearing is configured to rotate at least 180 degrees; and
an actuation device operably coupled to the mounting assembly and configured to pivotally actuate at least one panel of the array of panels between the first position and the second position.

15. The vehicular cargo restraint assembly of claim 14, wherein the mounting assembly comprises a locking device configured to resist jostling forces of the cargo when a vehicle is in motion in order to hold the position of the panel.

16. The vehicular cargo restraint assembly of claim 14, wherein the hinge is electronically actuated from the first position to the second position.

17. The vehicular cargo restraint assembly of claim 14, wherein the bearing is electronically actuated to rotate about the axis of rotation.

* * * * *